United States Patent Office 3,331,744
Patented July 18, 1967

3,331,744
PRODUCTION OF ISOTOPES FROM THERMO-NUCLEAR EXPLOSIONS
Theodore Brewster Taylor, La Jolla, Calif., assignor to the United States of America as represented by the United States Atomic Energy Commission
No Drawing. Filed Apr. 21, 1959, Ser. No. 807,959
5 Claims. (Cl. 176—10)

This invention relates to a method for producing isotopes from neutron bombardment in proximity to an atomic explosion.

It is well-known that many useful isotopes not generally available in nature can be produced by subjecting certain elements to neutron bombardment. In order to produce the artificial isotope in a sufficient quantity to be useful, it is necessary that neutrons be available in large numbers. When a large flux of neutrons is desired, the cost per neutron can become a very important factor in deciding the best source of supply.

A nuclear pile or reactor operating under controlled conditions is one type of neutron source having greater economy than, for example, a radium-beryllium source and a more practical source of neutron than a radioactive source. However, with a nuclear reactor the cost per neutron is sufficiently high that a more economical source is very desirable.

By this invention, a method is provided for producing isotopes from bombardment of neutrons released in an atomic explosion. The cost per neutron is low and the method can be used for large-scale production of many isotopes.

It is therefore an object of this invention to provide a method for producing isotopes from neutron bombardment.

It is a further object of this invention to provide a method for utilizing the neutrons from an atomic explosion.

Another object of the present invention is to provide a method for producing tritium, plutonium, uranium 233 or cobalt 60, by utilizing the neutrons from an atomic explosion.

Another object of the present invention is to provide a method for producing isotopes from bombardment of neutrons emitted in a nuclear explosion in which the isotopes produced may be recovered.

Further objects of the present invention will be apparent from the following specification and claims.

GENERAL PRINCIPLE

The general principle of the present invention is to employ an atomic explosion, preferably one which derives a considerable portion of its energy from a thermonuclear fuel, to provide neutrons which may be used to produce isotopes by transmutation although any isotope which may be produced by neutron bombardment may be produced by the method of the present invention. The preferred embodiment is the production of the isotopes $U^{233}$, $Pu^{239}$, $H^3$ or $Co^{60}$. Therefore, in the preferred embodiment, a suitable blanket for absorbing neutrons in thorium, uranium, lithium or cobalt, is placed on the ground, either as a large circular disk or as a lining of a partial spherical cavity on the ground. A thermonuclear bomb with a yield of the order of a megaton is then fired at such a distance above the ground that no appreciable cratering results and that only a very small thickness of blanket protecting material is vaporized. If desired the explosion is repeated until the desirable neutron capture product in the blanket has built to such a concentration as wanted.

If the blanket containing the material to be irradiated is to be recovered and processed after one or more nuclear detonations above it, the explosion must take place at such a distance that:

(1) The thermonuclear radiation from the ball of fire of the nuclear detonation can penetrate only a few millimeters into the blanket material. It is presumed that the thickness penetrated is also vaporized.

(2) The blanket should be capable of withstanding the hydrodynamic shock from the explosion.

Experiments were carried out during test detonations of atomic bombs which furnished data for the design of blanket protective coverings which survive the explosion. Although temperature as high as a quarter of a million degrees centigrade may exist at the surface of a thick piece of metal, this high temperature lasts for such a short period of time that only a few millimeters of material is vaporized. The balance of the metal piece is not badly damaged by the explosion. Thus, the requirement that the material to be irradiated be protected from the heat of the atomic explosion can be easily met.

With regard to survival of the hydrodynamic shock, data has been gained from atomic explosion tests which indicate relatively shallow craters from explosions in the ground. A steel or aluminum plate of the order of 1″ thick backed by hard ground or asphalt will not be seriously damaged by explosions a reasonable distance away, for example, a steel plate ½″ thick will survive the thermal effects of a 1 megaton explosion detonated 100 meters above it. In order to increase the shock resistance of such a steel plate it is preferable to prepare a cavity with a spherical surface having its center at the explosion point and lining the cavity with the steel plate. This prevents a pressure gradient from existing along the surface in such a direction as would otherwise force the plate outward from a point directly under the explosion point.

BOMB NEUTRONS

During an atomic explosion many neutrons are created primarily from the fission and fusion processes. The energy of the neutrons varies and a complete spectrum appears from 0 volts to about 15 mev. If the bomb is essentially a thermonuclear bomb with a very small amount of uranium present so that most of the neutrons are from the fusion process, the probability of a neutron being captured in the bomb material can be kept small. Furthermore, if the thermonuclear fuel at maximum reaction time is several neutron transport mean free paths in radius, most of the neutrons will thermalize to a bomb temperature of a few kilovolts before escaping into the air. As the bomb expands a few-fold it becomes considerably easier for the neutrons to escape into the air but by this time most of them are at the temperature of the bomb material, e.g., 1 kilovolt.

The neutrons which escape diffuse ahead of the hydrodynamic shock front. The shock front moves at a velocity about equal to the thermal velocity of the material within the ball of fire of the bomb. Since the temperature of the material drops below 1 kilovolt rapidly because of bomb expansion, the time required for hydrodynamic shock of a 1 megaton explosion to travel an initial 100 meters is about 1 millisecond, whereas the time required for a 1 kev. neutron to diffuse an initial 100 meters in air is less than half a millisecond. Thus, if the blanket is 100 meters from a 1 megaton explosion most of the neutrons which are originally travelling in the direction of the blanket will reach it before the shock. The physical phenomena which takes place before the shock arrives are known and predictable. However, after the shock arrives physical happenings are difficult to understand. It is known that some of the original neutrons which impinge on the blanket are reflected back into the air through which the shock is approaching.

For a practical design, the horizontal blanket dimensions should be large compared to the transport mean free path of the neutrons in the air which is about 20 meters. Hence a neutron which has been reflected by the blanket will very likely re-enter the blanket after re-reflection by the air. A detailed description of air to blanket diffusion process is complicated by the change of state of the air as the fireball expands into it. Since most of the neutrons react with the material of the blanket upon initially entering the blanket, those which reflect back into the air are small in number and contribute a secondary effect to the calculations which follow. An exception to this statement is possible when it is desired to produce plutonium in a uranium blanket because of the strong resonance capture in $U^{238}$ in which case many of the neutrons which diffuse back from the air may be at the proper energy for resonance capture and be more effective in producing plutonium than the early neutrons.

The production of the isotopes of the preferred embodiment follow the same general scheme except that consideration must be given to the energy of the neutrons desired, the thickness of the blanket, etc. so that each blanket must be designed for the particular isotope desired.

TRITIUM PRODUCTION

Assuming that the blanket protective coating of steel, aluminum or a ceramic material or a combination thereof has been selected, it is then necessary to select the most desirable matrix for holding the capturing $Li^6$ atoms. The area and volume of the blanket must be large enough to make efficient use of the bomb neutrons but small enough to contain a practical amount of $Li^6$ atoms. A 20% solid angle 100 meters from an explosion is a practical area for producing tritium (or other) isotopes. The area of a 20% solid angle blanket is then $2.5 \times 10^8$ cm.$^2$.

In order to get as high a concentration of tritium per $Li^6$ atoms as possible, it is desirable for the capture process to take place at thermal neutron energies, where the cross section is highest. Therefore the bomb neutrons must be moderated. As the ratio of the thermal capture cross section of $Li^6$ and hydrogen is about 3000, a dilute mixture of $Li^6$ and a hydrogenous substance is satisfactory.

However, a problem which is introduced when the capture probability in a blanket is high, is that the heating of the blanket by the 4.8 mev. released from the $Li^6$ capture process becomes appreciable and must be considered for blanket survival. That is, $$Li^6 + n \rightarrow He^4 + T^3 + 4.8 \text{ mev.} \quad (1)$$

Since no convenient hydrogen compounds with very high melting points exist, carbon is the most desirable moderator matrix material.

The root mean square distance which a neutron will travel in the process of being slowed down from 1 kev. to 0.025 ev. in carbon is $$(\bar{r}^2)^{1/2} = (2\lambda^2 j)^{1/2} \quad (2)$$

where $\lambda$ = the total mean free path, and
$j$ = the number of collisions for thermalization.

For carbon, $$j = \ln \frac{E_i}{E_f} \times \frac{1}{\xi}$$

where $E_i$ = initial energy of neutron
$E_f$ = final energy of neutron
$\xi$ = average logarithmic energy loss per collision.

It is assumed that $\lambda$ is independent of energy and equal to the transport mean free path both of which are approximately true for carbon over the energy range considered. Thus, $$\lambda = 2.7 \text{ cm.}$$

and $$j = \frac{\ln (1000/.025)}{0.16} = 66$$

and $$(\bar{r}^2)^{1/2} = (2 \times 7.3 \times 66)^{1/2} = 31 \text{ cm.}$$

If the $Li^6$ concentration is such that there are several thermal capture mean free paths in the blanket, the capture probability for neutrons which are not reflected by the blanket will be very high. Since the $Li^6$ thermal capture cross section is about 900 barns, the mass of $Li^6$ per unit area of the blanket to provide two capture mean free paths can be calculated from the following equation:

$$M = \frac{N_f \cdot A \rho_L}{\sigma_c \times N_o}$$

where M = the mass of $Li^6$ per unit area of the blanket so as to provide two capture mean free paths $N_f$ = # M.F.P.
$N_o$ = Avogadro's number
$\rho_L$ = density of Li.

That is

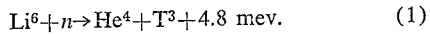

$$\frac{2 \times 6}{900 \times .6} = .02 \text{ gm./cm.}^2$$

Thus the composition of the blanket would correspond to $Li^6C_{1200}$ (the atomic ratio of $Li^6$ is 1 to 1200 of C). The total amounts of $Li^6$ and carbon required for the size blanket we are considering, then, are 5 and 10,000 tons, respectively. There is no particular neutronic reason for not using normal lithium (~70 tons), in order to have present 5 tons of $Li^6$. Because of the high temperatures developed in the blanket, however, there may be a reason for keeping the lithium concentration as low as possible in order that the lithium may be held by the carbon lattice even if it is above its melting point.

In order to determine the limitations of captured density in the blanket due to the heat of the capture process assume that the energy is deposited uniformly throughout the blanket. It is safe to allow the temperature to rise to 3000° C., which is under the sublimation point of carbon. Since the average specific heat of carbon is about 0.5 cal./gm. and the mass per unit area in the blanket is 50 gm., the largest allowable energy per cm.$^2$ of blanket is about $6.7 \times 10^4$ cal. It is shown above in Equation 1 that the energy released per capture in $Li^6$ is 4.8 mev. The tolerable number of captures in the blanket is $$\frac{E_a \times N_e}{E_r \times E_g} = C_n \quad (4)$$

where
$E_a$ = energy per sq. cm. allowed
$E_r$ = energy released per reaction
$E_g$ = ergs/electron volt energy
$N_e$ = number of ergs 1 calorie
$C_n$ = concentration of neutrons.

Therefore, $$\frac{6.75 \times 10^4 \times 4.187 \times 10^7}{4.8 \times 10^6 \times 1.6 \times 10^{-12}} = 3.67 \times 10^{17} \text{ n./cm.}^2$$

This corresponds to about $7 \times 10^{-7}$ moles of tritium per cm.$^2$ of blanket per irradiation. This also corresponds to about $2 \times 10^{-7}$ moles of tritium per mole of carbon or about $2 \times 10^{-4}$ moles of tritium per $Li^6$. If a 1 megaton bomb is exploded 100 meters from the blanket and one half of the neutrons within the 20% solid angle are captures, the above concentration will occur. This concentration will produce about 500 gm. of tritium per irradiation distributed uniformly throughout the Li. It is probable that the tritium exists in the blanket as atomic hydrogen and there may be some advantage to using a high melting point salt of another monovalent element like potassium, as a carrier for the lithium. This may increase the efficiency of holding the tritium.

PLUTONIUM PRODUCTION

Plutonium can be produced by neutron capture in $U^{238}$ similar to that which occurs in nuclear reactors.

At thermal neutron energies the $U^{238}$ capture cross section is 2.8 barns and the $U^{235}$ fission cross section is 600 barns. Hence, in normal uranium, the ratio of captures in $U^{238}$ to fissions in $U^{235}$ at thermal energies will be about $R = c./f. \times$ ratio of $U^{238}/U^{235}$ atoms
$R = 2.8/600 \times .143 = 0.66$ Since the energy released per fission is about thirty times as great as per capture, the blanket heating due to fission would be close to fifty times that due to capture. This clearly indicates that even in somewhat depleted uranium the majority of the captures cannot take place at thermal energies, but must take place at considerably higher energies, where the competition between fission and capture is small. The resonance capture region in $U^{238}$ is between 5 volts and 100 volts, so that it is desirable to arrange a system so that essentially all of the captures take place in the resonance region. The normal uranium concentration required in an infinite graphite matrix for a large probability of capture in the resonance region can be determined from the following. The resonance capture probability in the mixture is:

$$P = 1 - e^x \quad (5)$$

where $$x = \frac{A_u}{\epsilon \sigma SC}$$

and $A_u$ = The effective resonance absorption integral for uranium, $$A_u = \int_E^{E_o} (\sigma_a)_{eff} dE/E$$

and $(\sigma_a)_{eff}$ = Effective absorption cross section for uranium
$E$ = The initial energy of the neutron
$E_o$ = Final energy of the neutron
$\epsilon$ = Average logarithmic energy loss per collision in carbon
$\sigma_s$ = Carbon scattering cross section
$C$ = The ratio of carbon to uranium atoms in the mixture.

$\sigma_s$ is constant and equal to 4.7 barns over the energy range of interest, $\epsilon$ is 0.16 for carbon. Practically all of the contribution to $A_u$ arises from the 5 to 100 volt region, so the value of $A_u$ obtained for moderation from fission energies to thermal.

Because of very strong self-shielding of the resonances in $U^{238}$, $A_u$ is a function of the concentration of $U^{238}$ in the matrix; it approaches the value 240 barns for infinitesimal concentrations of $U^{238}$. Because of Doppler broadening of the resonances with increasing temperature, $A_u$ is also a function of temperature. If the temperature of the matrix is allowed to reach 2500° C., rough calculations indicate that the effective value of $A_u$ for $C=200$ is about 150 barns, so that, approximately $$P = 1 - C^{-200/C}$$

If $C=200$, the value of P is about 0.65.

Note that as C is increased, P decreases, but the final concentration of capture product in uranium increases. The choice of C is guided by the relative importance given to large total capture probability as opposed to large concentration.

For an estimate of the number of fissions which will occur per capture in the processes of slowing down to the lowest resonance region the following estimate can be made. The average fission cross section in $U^{235}$ between 5 volts and 1 kilovolt is about 40 barns, within a factor of two. Since the number of collisions required to degrade the neutron energy from 1 kilovolt to 5 volts is about 30, the total path length for slowing down is $30 \times \lambda_{carbon}$, or about 80 cm. (where $\lambda_c = 2.65$ cm.) so the mean free path per fission in a mixture of 200 atoms of carbon per atom of uranium ($UC_{200}$) is $$\lambda_f \text{ in } UC_{200} = N_c \times A/\sigma_f \times B \times CU^{235}/U^{238}$$

where $\lambda_f$ = mean free path for fission in matrix
$N_c$ = number of carbon atoms per atom of uranium
$A$ = atomic weight of carbon
$\sigma_f$ = average fission cross section
$\rho_c$ = density of carbon
$N_o$ = Avogadro's number
$U^{235}/U^{238}$ = ratio of $U^{235}$ atom to $U^{238}$ atoms in normal uranium.

Therefore, $$200 \times 12/40 \times 1.8 \times .6 \times .007 = 7.2 \times 10^4 \text{ cm.}$$

Thus, the number of fissions in $U^{235}$ per capture in $U^{238}$ will be:

$$\frac{30 \times \lambda}{7.2 \times 10^4} \times 0.8$$

where $30 \times \lambda$ = total slowing down length on carbon, and $$\frac{80}{7.2 \times 10^4} \times 0.8 = 8.9 \times 10^{-4}$$

If 20 percent of the neutrons are slowed to thermal energies, the number of fissions produced will still cause considerable heating. In order to prevent this, a small amount of cadmium can be placed in the matrix. The cadmium resonance cross section, at about 0.2 volt, is about 7000 barns, and the thermal cross section is close to 3000 barns. Thus, if the cadmium concentration in the lattice is, for example, five times the concentration of $U^{235}$ atoms, less than $(600/5 \times 3000) \times .2$, or less than one percent of the neutrons will cause a fission. The removal of neutrons from the $U^{238}$ resonance capture region, however, will amount to less than one percent. Also, uranium which has been depleted in its $U^{235}$ content can be used.

Following the same calculation used for the tritium production blanket, it is reasonable that the thickness of carbon be equal to the root mean square distance covered by a neutron as it is slowed from 1 kev. to the minimum resonance energy of 5 ev. For this case $$(\overline{r^2})^{1/2} = (2 \times 7.3 \times 33)^{1/2} = 22 \text{ cm.}$$

A Monte Carlo calculation based upon a selection of random numbers to represent neutron energies has been done in which the probabilities for reflection and transmission of 1 kev. neutrons before reaching 10 volts were calculated for neutrons incident upon a 15 cm. thick slab of graphite. The calculated transmission probability is 10 percent, while the reflection probability is 75 percent. Thus, since the resonance capture probability in an infinite medium of $UC_{200}$ is 80 percent, the net effect in this case would be to capture only about 12 percent of the incident neutrons due to the large number reflected from the carbon. It is clear the 15 cm. thickness of graphite is adequate as far as transmission is concerned, but the reflection probability is too high. It should be noted, however, that once a neutron has entered the blanket, its mean life for capture if not reflected is of the order of $10^{-6}$ seconds, whereas the mean life for capture in nitrogen in the air at normal density is of the order of one-tenth of a second. In addition, the average capture probability per collision of a 100 volt neutron in the blanket is about .06, whereas this number is about .003 for a 100 volt neutron in air. Thus, since the blanket's horizontal dimensions correspond to several scattering mean free paths in air, some of the neutrons which are diffusing in the air in the vicinity of the blanket at degraded energies closer to the resonance energy. Furthermore, if the bomb to blanket distance is about 100 meters, a large fraction of the neutrons will have been slowed down by the air, and their mean energy will be only slightly above 100 volts. Since the mean neutron energy at the blanket is a rather sensitive function of distance from the bomb, it is possible to pick a distance such that the majority of the neutrons arrive at energies close to the upper energy of the resonance capture energy region. It is to be expected that the fraction of the total number of neutrons emitted by the bomb which are captured in the blanket approaches the fractional solid angle subtended by the blanket.

If, then, the breeding blanket consists of 15 cm. of carbon containing one atom in 200 of uranium and about one in 6000 of cadmium, the heat developed through capture product concentration can be calculated. The energy released per capture is about 6 mev. Of this energy, roughly one half will be deposited in the carbon, since the mean free path for first Compton collisions of the emitted 1 mev. gamma rays is about the thickness of the blanket. About 1500 calories per gm. can be deposited in the blanket. If the captures take place uniformly throughout the blanket, the total amount of energy liberated per $cm.^2$ which will be tolerable is about $7 \times 10^4$ calories. This is the same number arrived at for the tritium producing blanket, which had twice the thickness, but *all* the reaction energy deposited in the blanket. By a calculation similar for tritium production, it can be shown that this corresponds to about $1.7 \times 10^{-4}$ gm. of plutonium per $cm.^2$ for the maximum tolerable amount to be formed per irradiation. Note that this, in turn, corresponds to about 70 gm. of $Pu^{239}$ per ton of uranium and about one-tenth that concentration in carbon in the final product after one irradiation. Here again there is a distinct advantage to distributing the uranium non-uniformly in the blanket—higher concentrations near the bottom—in order to insure uniform heating.

The problem of high temperature on the behavior of the low concentration uranium in the carbon matrix at temperatures approaching 3000° C. is much less serious than in the case of the tritium producing blanket. The uranium can be in the form of uranium dioxide, which has a *melting* point of over 2200° C. Because of the relatively long mean free path for energy deposition by the capture gamma rays, the uranium could be placed in the blanket in the form of 1 millimeter thick layers of $UO_2$ spaced every 2 cm. or so through the blanket.

In pile or neutronic reactor $Pu^{240}$ is produced subsequent to $Pu^{239}$ from the neutron bombardment of $Pu^{239}$. If $Pu^{239}$ is to be made efficiently, an appreciable amount of $Pu^{240}$ will be produced because of the long irradiation period of the uranium slugs in an efficient cycle. The production of $Pu^{240}$ is undesirable as it is an isotope that has a high spontaneous fission activity. Therefore, a system which has essentially zero $Pu^{240}$ production with simultaneous production of $Pu^{239}$ is advantageous.

The $Pu^{240}$ content in the blanket, even if the irradiations are repeated at long enough intervals so that the $Np^{239}$ has decayed between them, should be extremely low. The total resonance absorption integral for $Pu^{239}$ is 520 barns, and a large contribution to this comes from energies below one volt, where capture in the cadmium will be an order of magnitude more probable than capture in the $Pu^{239}$. Within the $U^{238}$ resonance capture range, an upper limit to the ratio of $Pu^{240}$ to $U^{239}$ production rates will be of the order of the ratio of existing concentrations of $Pu^{239}$ to $U^{238}$. Even when the $Pu^{239}$ concentration has reached 1000 gm. per ton of $U^{238}$, the ratio will be of the order of $10^{-3}$. The resonance capture cross sections of $U^{239}$ and $Np^{239}$ are not known, but they can hardly be an order of magnitude higher than in $U^{238}$ in the $U^{238}$ resonance capture region.

$U^{233}$ PRODUCTION $U^{233}$ can be produced by capture of neutrons in $Th^{232}$ in the reaction $$Th^{232} + n \rightarrow Th^{233} + B \rightarrow Pa^{233} + B \rightarrow U^{233} \quad (7)$$

The resonance absorption integral of $Th^{232}$ is about 80 barns, or roughly one third of that of $U^{238}$, and the largest resonances occur at about the same energies, i.e., between 10 and 100 ev. Hence, the breeding blanket should be chosen on the same basis as the $Pu^{239}$ production blanket, but with a concentration corresponding to about $ThC_{75}$. It should be noted, however, that since there is no fission in $Th^{232}$ at the neutron energies we are considering, there is no reason to attempt to prevent thermal capture. The thermal capture cross section in $Th^{232}$ is only 7.0 barns, so the concentration of thorium in the blanket which will provide a thermal mean free path for capture across the blanket is very much higher than that required for a high probability of capture in the resonance region. Hence, it seems reasonable to choose a blanket which consists of 15 cm. of carbon containing an atomic concentration of thorium of about 1/75.

Considerations of heating similar to those in the preceding section lead to maximum concentrations of $Th^{233}$ per irradiation of about 25 gm. of $U^{233}$ per ton of thorium.

It should be pointed out that, since the neutrons incident on the blanket are well below the $n-2n$ threshold for $Pa^{233}$, the $U^{232}$ content of the final product, even after many irradiations, will be negligible. On the other hand, the gamma activity of the $Pa^{233}$ formed will be exceedingly large for several half-lives of $Pa^{233}$ (27 days), and will produce a formidable radiation hazard in the vicinity of the blanket after it has been irradiated. Thus the blanket should be allowed to "cool" for awhile before processing.

The thorium should exist in the blanket as $ThO_2$, which has a melting point greater than 2800° C. It appears that the capture heating limitations on the $U^{233}$ production scheme are less severe than tritium or plutonium production.

$Co^{60}$ PRODUCTION

The scheme follows that for tritium production very closely, except that the concentration of the parent $Co^{59}$ must be about 20 times that of $Li^6$ in the blanket or must correspond to about $Co^{59}C_{60}$. Thus the total amount of $Co^{59}$ in the blanket for production should be roughly 800 tons. The resulting amount of $Co^{60}$ per irradiation, for the use we have been considering, is then about 20 kilograms.

BLANKET DESIGN

As has been shown in the foregoing, the blanket consists of a matrix comprising the material to be irradiated held in a suitable moderating structure plus a structural cover. The structural cover is preferably about a ½" thickness of steel placed in contact with the graphite moderator. The steel can be protected with a ceramic coating such as a procelain coating well known in the art or a coating of a substance such as magnesium oxide. Another ceramic coating which would be quite satisfactory is concrete to a depth of about 1" or 2" which would be quite economical to use. The ceramic coating however should not be thick enough to have appreciable neutron capture take place in it.

THE NEUTRON SOURCE

The neutron source selected can be a fission bomb, however, it is preferable to use a thermonuclear device with its corresponding large supply of neutrons. The bomb should preferably have a minimum amount of uranium as to produce fewer fission productions and to have more free neutrons available for the irradiation process. The bomb can be placed over the blanket suspended by a suitable tower and could be suspended over the blanket from a balloon, ground fired via a missile, or dropped from an aircraft.

OTHER EMBODIMENTS

It is understood by the scope of this invention that other isotopes can be produced by neutron induced reactions. The preferred embodiments have been given as important examples and the calculations given show how other matrices can be designed. Therefore, the present invention is not limited in scope by the foregoing specification but only by the appended claims.

What is claimed is:

1. A method for producing isotopes by neutron bombardment comprising dispersing an element selected from the class consisting of $^6$Li, $^{238}$U, $^{232}$Th, and $^{59}$Co, said elements being contained within a carbon blanket such that the ratio of lithium to carbon is 1:1200, uranium to carbon is 1:200, thorium to carbon is 1:75, and cobalt to carbon is 1:60, said blanket having an area of approximately $2.5 \times 10^8$ cm.$^2$ and a thickness being in the range of 15–31 cms., protecting said blanket with a structural cover of about one inch thickness and selected from the class consisting of steel, concrete, and aluminum, placing said covered blanket on a solid foundation at a distance of approximately 100 meters from a nuclear bomb of about 1 megaton yield, exploding said nuclear bomb, and recovering the produced isotope from the irradiated blanket.

2. A method for producing tritium using the process of claim 1 wherein the said carbon blanket contains 1 lithium to 1200 carbon atoms and said thickness of the blanket is approximately 31 cms.

3. A method for producing plutonium using the process of claim 1 wherein the said carbon blanket contains $^{238}$U in the ratio of 1 uranium to 200 carbon atoms and said blanket having a thickness of about 22 cms.

4. A method for producing $^{233}$U using the method of claim 1 wherein the said carbon blanket contains $^{232}$Th in the ratio of 1 thorium to 75 carbon atoms, said blanket having a thickness of about 15 cms.

5. A method for producing $^{60}$Co using the method of claim 1 wherein the said carbon blanket contains $^{59}$Co in the ratio of 1 cobalt to 60 carbon atoms, and said blanket having a thickness of about 31 cms.

References Cited

UNITED STATES PATENTS 2,812,303  11/1957  Daniels _____ 204—193.2

FOREIGN PATENTS 922,877  2/1947  France.
1,174,700  11/1958  France.

OTHER REFERENCES

Plowshare Series, URCL–5253, University of California Radiation Laboratory, Sept. 8, 1958, pages 4, 5, 10, 79–81.

Power Generation, April 1949, pages 74, 75, 76, 126, 127, 128, 129.

Proceedings of the Second United Nations International Conference on the Peaceful Uses of Atomic Energy, vol. 8, page 305, 1958.

"The Effects of Atomic Weapons," Los Alamos Scientific Laboratory 1950, page 12, Sept. 1, 1947.

REUBEN EPSTEIN, *Primary Examiner.*

ROGER L. CAMPBELL, *Examiner.*

R. L. GOLDBERG, *Assistant Examiner.*